United States Patent
Damm

[11] 3,757,940
[45] Sept. 11, 1973

[54] MEMORY SYSTEM HAVING TWO CLOCK PULSE FREQUENCIES

[75] Inventor: David A. Damm, Toledo, Ohio

[73] Assignee: Owens-Illinois, Inc., Toledo, Ohio

[22] Filed: June 19, 1972

[21] Appl. No.: 263,966

[52] U.S. Cl. .............................. 209/74 M, 209/75
[51] Int. Cl. ............................................. B07c 5/00
[58] Field of Search .................... 209/74, 75, 74 M, 209/88

[56] References Cited
UNITED STATES PATENTS

| | | | |
|---|---|---|---|
| 3,313,409 | 4/1967 | Johnson | 209/75 X |
| 3,565,249 | 2/1971 | Codding | 209/74 M |
| 3,581,889 | 6/1971 | Abraham et al. | 209/74 |

Primary Examiner—Richard A. Schacher
Assistant Examiner—Gene A. Church
Attorney—Steve M. McLary et al.

[57] ABSTRACT

A series connected dual memory system in which the clocking frequency of one memory is independent of the clocking frequency of the other memory. This system is designed to store and shift defective article information generated by an article inspection machine. The machine removes articles from a continually moving conveyor, indexes the articles one at a time through a series of inspection stations, generates a defect signal if an article fails to pass any one of the inspections, and returns all articles to the conveyor. A first memory stores defective article information. This information is shifted in the memory in synchronism with the index of the article through the inspection machine by a clock pulse at a frequency proportional to the index speed. Any defective article information is transferred into a second memory as the article to which the information pertains is replaced on the conveyor. As the article is moved away from the inspection machine, the information is shifted in the second memory in synchronism with the speed of the article by a clock pulse at a frequency proportional to the speed of the conveyor. When the information in the second memory reaches a rejection station downstream of the inspection machine, the rejection station is activated to remove the article from the conveyor.

21 Claims, 44 Drawing Figures

Patented Sept. 11, 1973

Patented Sept. 11, 1973 3,757,940

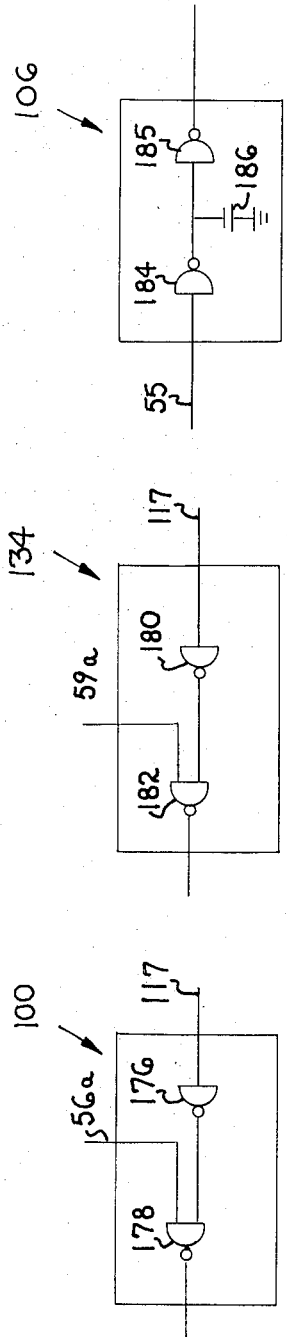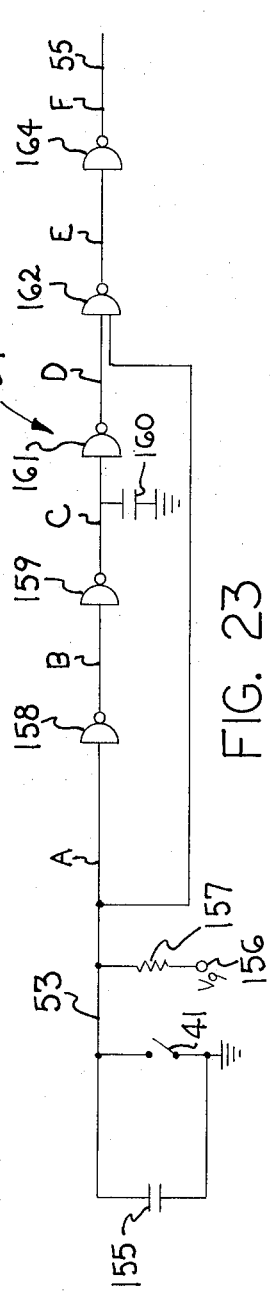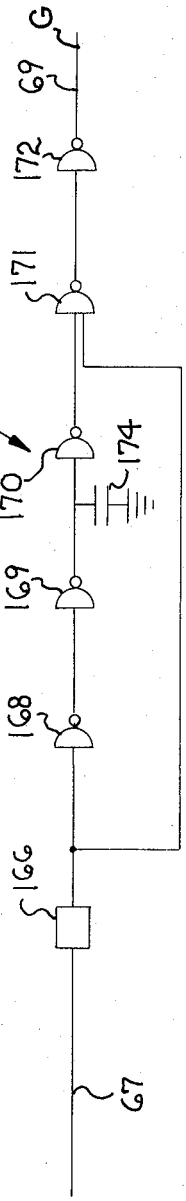

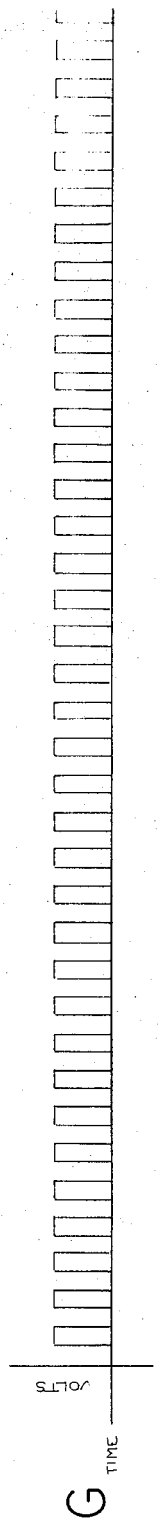
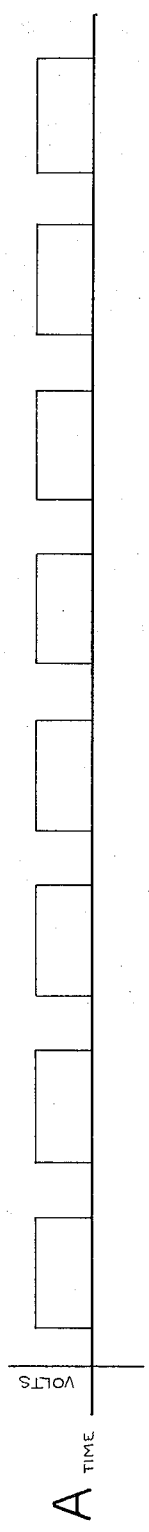
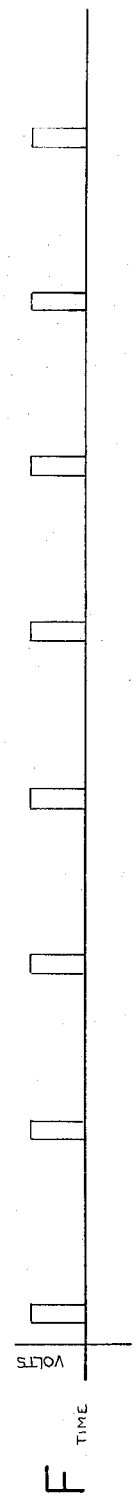
FIG. 28

MEMORY SYSTEM HAVING TWO CLOCK PULSE FREQUENCIES

BACKGROUND OF THE INVENTION

This invention relates to a memory for an article inspection machine. More particularly, this invention relates to a memory for an article inspection machine which removes articles from a conveyor, indexes the articles through a plurality of inspection stations, generates a signal if an article is defective, and returns all articles to the conveyor. Most specifically, this invention relates to a memory system for inspection machines of the type described wherein two series connected memories have information shifted in them at two independent clock pulse frequencies to allow rejection of defective articles at a point downstream of the inspection machine.

One difficulty with any article inspection machine is the necessity of providing a memory. Generally in such machines, a plurality of inspections are made at different locations. However, a defective article cannot be rejected at the station which detects a flaw, since it is generally within the confines of the machine. Thus, a memory is provided to "remember" a defective article and cause it to be rejected when it is free of the inspection stations. Mechanical pin type or magnetic belt memories have been used with some success. However, these memories all require a rapid rejection after the end of inspection. This is true since the position of the article information within the memory is a function of the rate of progress through the inspection machine. Thus, rejection must occur before the speed of index or travel of the article changes from that imparted by the inspection machine. Otherwise, the correlation of the memory information with the article would be lost. Many systems of this type have been described in the prior art and are illustrated by U.S. Pats. Nos. 3,565,249; 3,263,810; 3,259,240; and 3,581,889. However, these systems were not capable of "remembering" article defect information and rejecting a defective article after it had deviated from its speed at the time of inspection. It is often desirable to remove the rejection area from the immediate proximity of the inspection machine. This function could not be done by the prior art. I have devised a memory system which transfers information, at the point of coincidence, from a first memory being clocked at a rate proportional to the inspection machine speed to a second memory system being clocked at a rate proportional to speed of a removal system for inspected articles. This allows "remembering" information about an article to achieve rejection of a defective article from the removal system at a point remote from the inspection machine.

SUMMARY OF THE INVENTION

My invention is an apparatus for inspecting and segregating articles which comprises the following elements: conveyor means for moving articles in a single file; an article inspection machine located adjacent the conveyor means for receiving articles one at a time from the conveyor means, serially indexing the articles through a plurality of inspection stations, and releasing inspected articles to the conveyor means; an article defect logic and detection means connected to the plurality of inspection stations for generating one or more signals if an article is defective in one or more aspects; a rejection means adjacent the conveyor means downstream of the inspection machine for removing defective articles from the conveyor means; first clock means for generating a series of machine clock pulses in synchronism with the index cycle of the inspection machine; first memory means connected to the article defect logic and detection means and to the first clock means for storing defective article information generated by the article defect logic and detection means and for shifting the stored information in response to the machine clock pulses of the first clock means in synchronism with the index of the article from inspection station to inspection station; second clock means for generating a series of conveyor clock pulses in synchronism with the speed of travel of the conveyor means, the frequency of the machine clock pulses and the conveyor clock pulses being independent of one another; and second memory means connected to the second clock means, the first memory means, and the rejection means for receiving defective article information from the first memory means as the article is released to the conveyor means, for shifting the information in response to the conveyor clock pulses in synchronism with the movement of the article along the conveyor means, and for actuating the rejection means as the article reaches the rejection means to thereby reject a defective article.

BRIEF DESCRIPTION OF THE DRAWINGS

FIGS. 6A-21A illustrate, in a schematic form, the status of the defective article information in the conveyor memory at each position of the article as shown in FIGS. 6-21.

FIG. 22 is a schematic circuit diagram of the conveyor clock generator;

FIG. 23 is a schematic circuit diagram of the machine clock generator;

FIG. 24 is a schematic circuit diagram of a typical reject signal conditioning unit;

FIG. 25 is a schematic circuit diagram of another typical reject signal conditioning unit;

FIG. 26 is a schematic circuit diagram of a typical clock delay circuit;

FIG. 28 is a graph showing the machine memory clock pulse wave form, the conveyor memory clock pulse wave form, and the gauging pulse wave form on a common time base to illustrate the time relationship to these three wave forms.

DETAILED DESCRIPTION OF THE DRAWINGS

Figure 1:
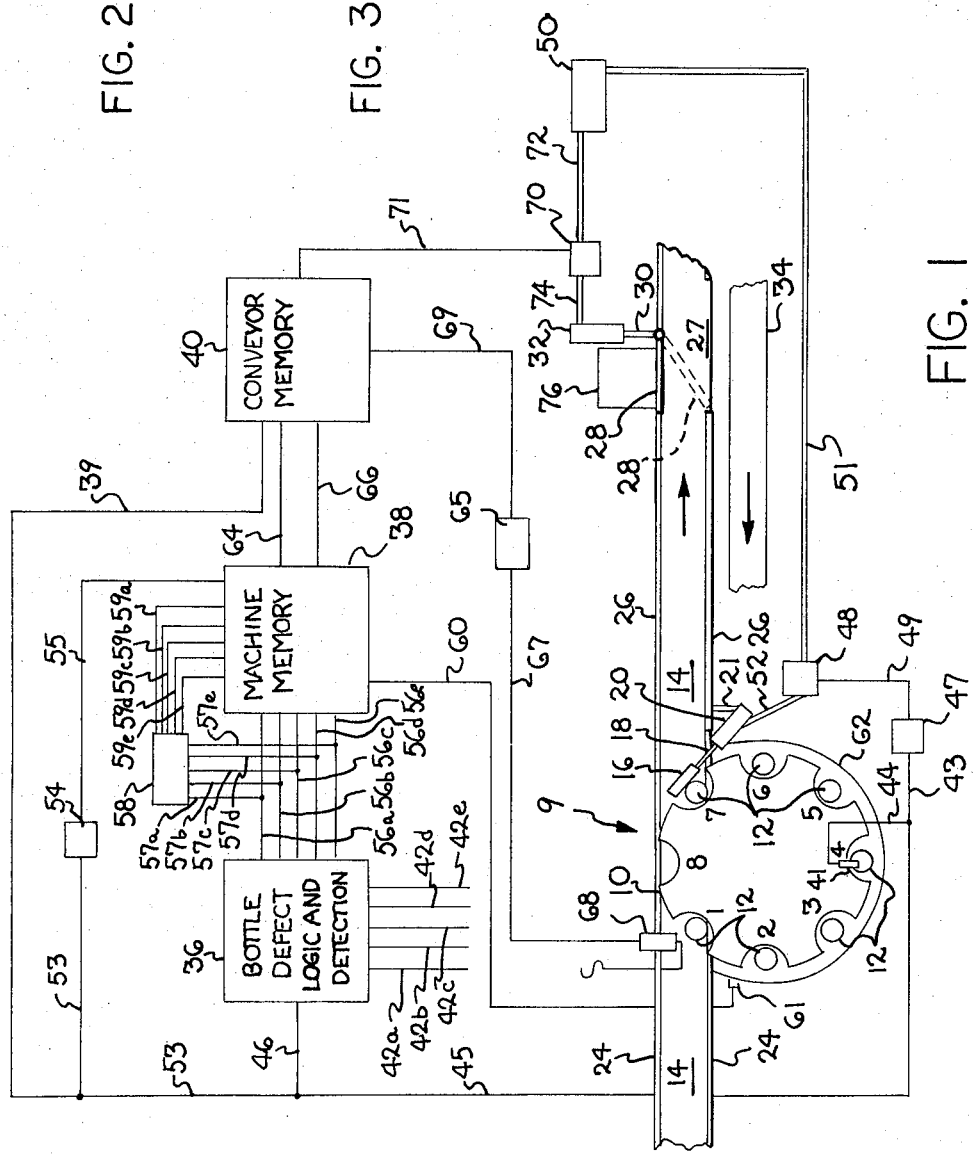
FIG. 1 is a block diagram of an embodiment of the present invention showing the interrelation of the inspection machine, the article conveyor, the memory system, and the rejection station.

FIG. 1 shows the mechanical and electronic apparatus of the present invention in a schematic form. The present invention is designed specifically to operate with a bottom gauging apparatus such as that described in U.S. Pat. No. 3,313,409, the teachings of which are hereby incorporated by reference. It is believed that the teachings of the cited patent are sufficient to allow one skilled in the art to utilize the present invention when described in a schematic form. The gauging apparatus or article inspection machine is generally designated by the numeral 9. A rotatable disk 10 having pockets cut therein for receiving glass containers 12 to be inspected is positioned over a constantly moving conveyor 14. In some cases, the conveyor 14 is actually divided into two independent segments. Thus, in the broadest sense, the conveyor 14 is a conveyor means for delivering and removing articles from the gauging apparatus 9. The conveyor 14 presents containers 12 one at a time to the pocket of the rotatable disk 10 designated as 1. As taught in U.S. Pat. No. 3,313,409, the container 12 positioned in pocket number 1 is sequentially rotated to positions noted as 2, 3, 4, 5, 6 and 7. Inspection of the container is carried out at positions 2, 3, 4, 5 and 6 by apparatus which is not shown, but which is well known to those skilled in the art. Position number 7, as noted in FIG. 1, is a position in which a container is held prior to its release to the conveyor 14. If the container 12 has been passed by the inspection devices, the container is released and allowed to proceed down the conveyor 14. In the prior art, if the container 12 were found to be defective in some manner, it would then be held in position and rotated to the position noted as 8 in FIG. 1, at which position it would be rejected. The container 12 is held in position in position number 7 by a tip 16 attached to the extending rod 18 of an air motor 20. The air motor 20 is cycled in a manner to be described later. The air motor 20 may be supported from the framework of the conveyor 14 by a support bracket 21. It will be noted that the conveyor 14 has substantially continuous inlet guide rails 24, which aid in guiding the container 12 into the pocket noted as 1. There are, in addition, outlet guide rails 26, which guide the container 12 after passage through the inspection apparatus 9. It will be noted that at a position downstream from the point at which the container 12 is released to the conveyor 14 to continue its travel, the outlet guide rail 26 is interrupted on one side by a space designated as 27. The space 27 is provided to allow rejection of defective containers in a manner to be herein described. In addition, the opposite side of the conveyor 14 contains a moveable section of the guide rails 26 designated as 28. The moveable section 28 is shown in its closed position, with the open position shown in phantom lines. The moveable section 28 is pivotally mounted on a conventional crank mechanism which is operated by the movement of the operating rod 30 of an air motor 32. Containers 12, which are rejected through the gap 27 in the outlet guide rails 26 fall onto a rejection conveyor 34, which is commonly located somewhat below the plane of the conveyor 14, and are conveyed away for disposal.

Figure 2:
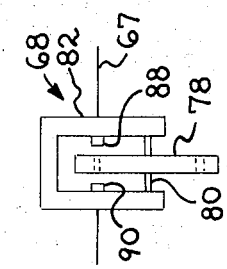
FIG. 2 is a side, elevational view of the conveyor signal generator.
Figure 3:
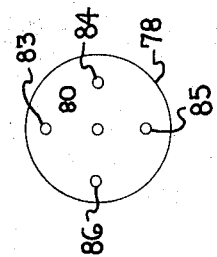
FIG. 3 is a side view of the code wheel of the conveyor signal generator of FIG. 2, removed from the apparatus shown in FIG. 2.

It may be seen from the block diagram of FIG. 1, that the memory system of the present invention comprises three major components: a bottle defect logic and detection system 36, a machine memory 38 and a conveyor memory 40. The bottle defect logic and detection unit 36 is of the type well known in the art and may be of the type such as that shown in U.S. Pat. No. 3,313,409. Signals from the detection equipment mounted above the rotatable disk 10 are fed into the bottle defect logic and detection unit 36 through five input lines 42a, 42b, 42c, 42d and 42e. As previously noted, the containers 12 are sequentially transferred from positions 1 through 7 by the rotation of the rotatable disk 10. To ensure that the gauging of the container 12 is performed only when the container 12 is in the proper position and the index cycle has ended, a gauging switch 41 is provided. This switch may be of the type such as the switch 191 shown in U.S. Pat. No. 3,273,710, the teachings of which are herein incorporated by reference. The purpose of the gauging switch is to provide a signal to the bottle defect logic and detection unit 36 to accept a signal which enters the unit 36 through any one of the defect signal lines 42 a through e. In FIG. 1, an output line 44 is shown as transmitting the bottle gauging pulse. The bottle gauging pulse is transmitted from the output line 44 through suitable electric wiring means 45 and 46 to the bottle defect logic and detection unit 36. In addition, the gauging pulse is transmitted through a wire 43 to a delay unit 47. The delay unit 46 controls the cycling of a solenoid valve 48. The solenoid valve 48 is connected to a source of air under pressure 50 by a pipeline 51. The outlet of the solenoid valve 48 is connected to the air motor 20 by a pipeline 52. The delay unit 47 accepts the gauging pulse from the gauging switch 43 and performs a delay function to cause the air motor 20 to function as follows: just prior to the end of the gauging period, the delay unit 47 transmits a signal to the solenoid valve 48 to admit air to the air motor 20. This causes the rod 18 to extend. The rod 18 remains extended during the transfer cycle to retain a container 12 which moves into position 7 on the rotatable disk 10. Then, the signal from the delay unit 47 ceases, the air to the air motor 20 is stopped, and the rod 18 retracts. This allows the container 12 in position 7 to move away on the conveyor 14 before the next transfer cycle, thus leaving position 7 empty to accept the next container 12. The gauging pulse is also used as a clock pulse for the machine memory 38. The gauging pulse is fed into a machine clock generator 54 by wiring means 53 connected to the electrical wiring means 45. Finally, the wiring means 53 is connected to an electrical wiring means 39 connected to the conveyor memory 40. The output from the machine clock generator 54 is fed into the machine memory 38 through suitable wiring 55. The purpose of the machine clock generator 54 is to provide a clock pulse input through the wiring 55 to the machine memory 38 to allow bottle present and defective bottle information to be indexed as the container 12 to which it pertains is indexed by the rotatable disk 10. There are five output channels from the bottle defect and logic detection unit, 56a, b, c, d and e. The defective bottle information carried by the output lines 56a through e is fed into the memory 38 and is indexed as the container 12 to which the information pertains is indexed by the rotatable disk 10. In addition, the defective bottle information is also transmitted to the machine memory 38, via a selector switch 58 through lines 59a, b, c, d and e, which are selectively interposable between the information carried by the wiring 56a through e and the machine memory 38. The selector switch 58 serves a "bottle save function" which will be explained in detail later. The final input to the machine memory 38 is a bottle presence signal furnished through an electrical wire 60 connected to a bottle presence switch 61. The bottle presence switch 61 is conveniently mounted on an arcuate guide rail 62 which surrounds the rotatable disk 10 and helps hold the containers 12 in their proper position. The bottom presence switch 61 is mounted adjacent to the position noted as number 1 in FIG. 1 such that when a container 12 is indexed from the loading position or the number 1 position to the first inspection position or the number 2 position, a signal is generated by the bottle presence switch 61 and transmitted to the machine memory 38 via the electrical wire 60. The purpose of this function is to detect if a bottle 12 is in position at the gauging station and to ensure that a false rejection signal is not generated by the gauging apparatus 9 due to the absence of a bottle at any one of the inspection stations. Finally the output of the machine memory 38 is fed into the conveyor memory 40. If any one of the inspection stations 2 through 6 determines that a container 12 is in some way defective, a rejection signal will be transmitted from the machine memory 38 to the conveyor memory 40 through an electrical connection 64. The machine memory 38 has an additional output to the conveyor memory 40 which is selective in nature and may be energized by the use of the selector switch 58. This is a "save" signal and is transmitted to the conveyor memory 40 through an electrical wire 66. The operational speeds of the rotatable disk 10 and the conveyor 14 are not necessarily synchronized. Thus, it is necessary to generate a separate clock input for the conveyor memory 40. This function is accomplished by the conveyor signal generator 68 and conveyor clock pulse generator 65. The signal is transmitted from the conveyor signal generator 68 to the conveyor clock pulse generator 65 through electrical wiring 67, and the clock pulse is transmitted to the conveyor memory 40 through suitable electric wiring 69. The details of the conveyor signal generator 68 are shown in FIGS. 2 and 3 and will be explained in conjunction with those figures. The output of the conveyor memory 40 is a signal to a solenoid valve 70 transmitted by suitable electric wiring 71. The solenoid valve 70 is connected to the source of air under pressure 50 by a pipe 72. The output of the solenoid valve 70 is connected to the air motor 32 by a pipe 74. When the solenoid valve 70 receives a rejection signal through the wire 71, it opens and allows air to flow from the source of air under pressure 50 through the pipe 72, through the pipe 74, and into the air motor 32. This operates the rod of the air motor 30 and causes the moveable section 28 to function, thereby rejecting a container 12 in one of two selectable modes. As was previously noted, the moveable section 28 may move outward in such a fashion that a container 12 is pushed through the space 27 and onto the rejection conveyor 34 for removal. In addition, the machine memory 38, as will be explained later in detail, contains a function controlled by the selector switch 58 which will allow a selected container 12 which is defective to be saved for further examination. In such an event, the moveable section 28 is extended slightly in advance of the arrival of the container 12 at the rejection position, and the container 12 is guided off of the conveyor 14 and into a holding bin 76 for further examination.

Turning now to FIG. 2, the conveyor signal generator 68 is shown in an end view for a further understanding of its functioning. An opaque code wheel 78 is rotatably mounted on a shaft 80 which is secured between the legs of a substantially U-shaped housing 82 mounted above the conveyor 14. The code wheel 78 is positioned above the conveyor 14 in such a manner that the movement of the conveyor 14 causes the code wheel 78 to rotate at a speed corresponding to the lineal speed of the conveyor 14. As seen in FIG. 3, the code wheel 78 has four openings 83, 84, 85 and 86 drilled completely through it, spaced at about 90° intervals about its periphery. Also carried within the legs of the U-shaped housing 82 are a photoelectric sensor 88 and a light source 90. The photoelectric sensor 88 and the light source 90 are positioned substantially in alignment with one another such that if the code wheel 78 were not interposed between the photoelectric sensor 88 and the light source 90, the photoelectric sensor 88 would be continually illuminated. However, the code wheel 78 is interposed between these two elements, and, as it rotates, the photoelectric sensor 88 may receive light from the light source 90 only when one of the holes 83 through 86 pass in front of the light source 90. It is this passage of the holes 83 through 86 in front of the light source 90 which generates the conveyor signals which are converted into the clock pulses by the conveyor clock pulse generator 65. That is, each time the light source 90 is allowed to shine through one of the four holes 83 to 86, the photoelectric sensor 88 produces a signal. As will be explained later in detail, the clock pulses are used to operate the conveyor memory 40 in such a manner that the position of a container 12 on the conveyor 14 is accurately represented after its release from the exit position 7.

Figure 4:
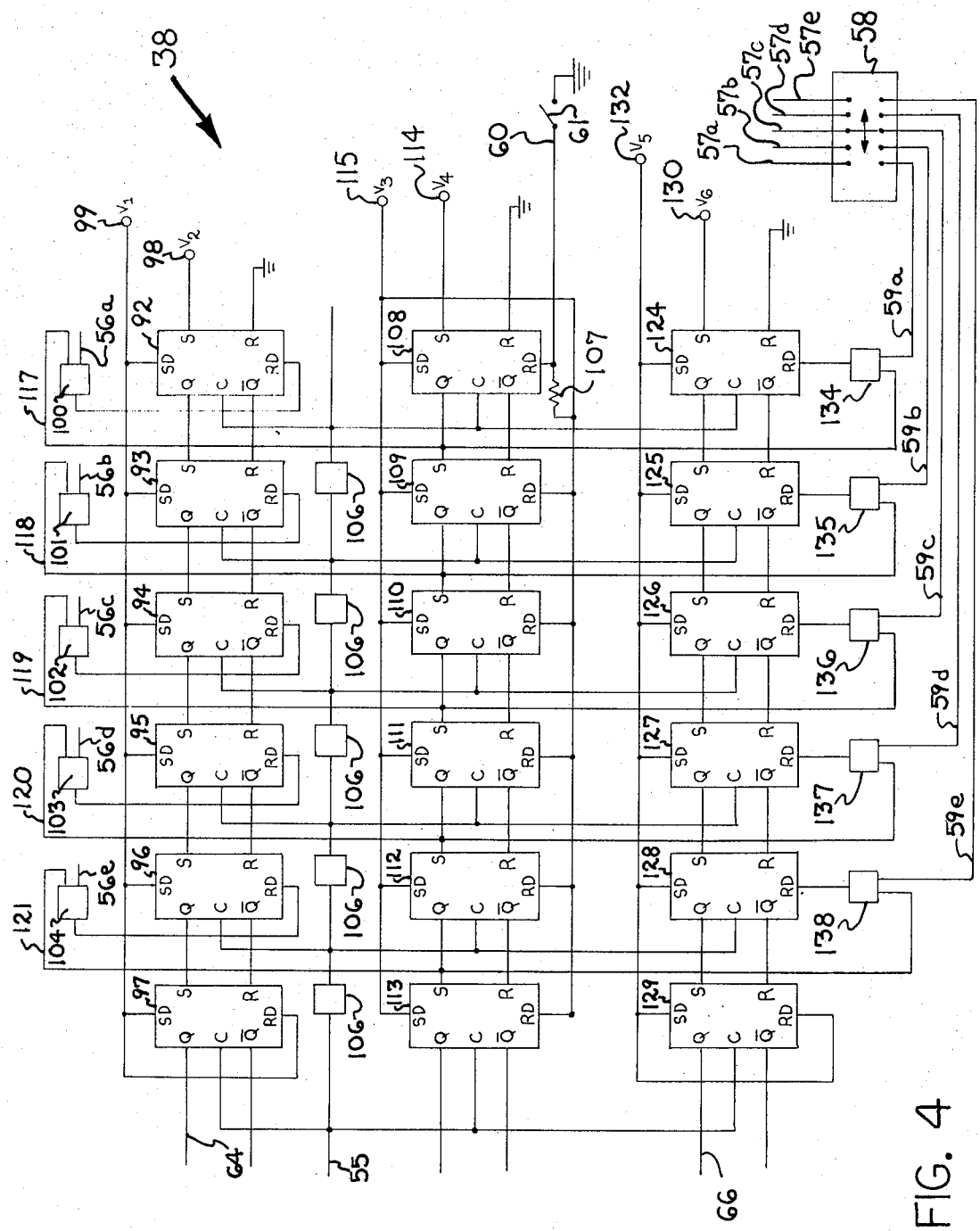
FIG. 4 is a schematic circuit diagram of the machine memory of FIG. 1.

A circuit diagram for the machine memory 38 is shown in FIG. 4. It will first be noted that there are three independent, parallel memory units contained within the machine memory 38. Each of the three parallel memory units is made up of six identical flip-flop units connected in series. The flip-flops may be a model MC 664 manufactured by the Motorola Corporation. Each of the flip-flop units have seven terminals available for connection. The input terminals are labeled "S" for set and "R" for reset. The output terminals are labeled "Q" and "Q̄". In addition, there are terminals labeled "SD" for direct set and "RD" for direct reset. A signal into the "SD" or the "RD" terminal may change the operational state of the flip-flop regardless of the input signals. The final connection available for the flip-flops is the terminal labeled "C" which is the clock input terminal. A pulse into the clock input terminal will cause the flip-flop to assume whatever state is indicated at the "S" and "R" terminals.

The uppermost memory unit or defective bottle memory is composed of six identical flip-flops, 92, 93, 94, 95, 96 and 97 connected in series. The first flip-flop in the series 92 has a voltage source 98 connected to the "S" terminal. The "R" terminal of the first flip-flop 92 is grounded. This configuration ensures that the first flip-flop 92 is biased in the "on" condition. The "SD" terminals of all of the flip-flops 92 through 97 are connected in common to a voltage source 99 which ensures that no signal can be transmitted to the "SD" terminal, thereby inadvertently changing the state of any of the flip-flops 92 through 97. In addition, it will be noted that the same voltage source 99 is connected to the "RD" terminal of the final flip-flop 97 in the first memory series. This is required because the final flip-flop 97 receives no bad bottle information but is simply used as an output to the conveyor memory 40. Thus, it is necessary to ensure that a signal cannot be received on either the "SD" or the "RD" terminals of the flip-flop 97 and ensure that the memory information therein is retained. The "RD" terminals of the flip-flops 92 through 96 are connected to identical reject signal conditioning units 100 through 104 (see FIG. 24). The signal conditioning units 100 through 104 have two independent inputs. One of the inputs is a bad bottle signal as transmitted by the electrical wiring means 56a through 56e. The other input is a bottle presence signal, the generation of which will be discussed in conjunction with the second parallel memory unit.

The clock signal is transmitted from the wiring 55 into the flip-flops 92 through 97. It will be noted that the first flip-flop which receives the clock pulse is the flip-flop 97. This, of course, is conventional practice in shift register type memory systems, since the flow of information is from right to left as viewed in FIG. 4. The clock signal is delayed by five identical clock delay circuits 106 (see FIG. 26). The purpose of the clock delay circuits 106 is to ensure that the clock pulse is delayed between the flip-flops 96 through 92 to prevent early arrival of the clock pulse to a preceding shift register and the consequential destruction of the information contained therein before the information can be read out into the subsequent flip-flop. That is, the occurrence of a pulse at the "C" or clock terminal of any one of the flip-flops 92 through 97 is in effect a signal to the flip-flop to wipe out whatever information it contains at that time and assume that state seen by its "S" and "R" terminals. Since all of the flip-flops 92 through 97 are connected in series with the "Q" terminal of one flip-flop connected to the "S" terminal of the next flip-flop and the "$\bar{Q}$" terminal connected to the "R" terminal, this then means that the occurrence of a pulse at the "C" terminal will set the flip-flop in whatever state the "Q" and "$\bar{Q}$" terminals of the preceding flip-flop had assumed. This then is the memory function and allows information placed in one of the flip-flops to be moved sequentially from right to left as the clocking pulses occur.

The flip-flop 92 is electrically connected to the reject signal conditioning unit 100 such that an output pulse from the reject signal conditioning unit 100 will be entered in the "RD" terminal of the flip-flop 92. A signal from the reject signal conditioning unit 100 indicates that a defective bottle signal has been entered through the electrical wiring 56a into the reject signal conditioning unit 100. Such a signal will overcome the initial condition presented by the voltage source 98 to the "S" terminal of the flip-flop 92 and set the flip-flop 92 in a condition indicating that a bad bottle was detected at station number 2 in the gauging apparatus 9. It should be noted at this point that the logic used throughout this system is essentially a logic which indicates the presence of an information signal by the lack of voltage. That is, all of the logic is preplanned such that the occurrence of a defect signal from the gauging apparatus 9 will result in one of the shift registers 92 through 96 being cleared to a zero state. This then, in turn, means that when the clock pulse reaches the flip-flop 93, the flip-flop 93 will see a zero input from the flip-flop 92 if the flip-flop 92 possesses a defective bottle signal. Then, after the delay imparted by the clock delay circuit 106 interposed between the flip-flops 93 and 92, the clock pulse will cause the flip-flop 92 to assume the one or "on" state, due to the initial condition input voltage from the voltage source 98. The zero or "off" information then passed to the flip-flop 93 will be, in turn, passed to the flip-flops 94, 95, 96 and 97 by subsequent clock pulses. Thus, the information indicating a defective bottle will finally be passed to the flip-flop 97.

The center parallel memory circuit is provided to retain information as to the presence or absence of a container 12 in the inspection apparatus 9. It should be readily apparent that, again, six identical flip-flops 108 through 113 are connected in series. The final flip-flop 113 is actually not needed, since all of the defect information has been processed by this point and bottle presence information is no longer needed. However, for ease of construction, the sixth flip-flop 113 is provided. These flip-flops 108 through 113 are identical to the flip-flops previously described in conjunction with the defective bottle memory circuit. Again, the "S" terminal of the first flip-flop 108 is biased in the "on" position with a voltage source 114. The "R" terminal of the flip-flop 108 is again grounded. In addition, however, both the "RD" and the "SD" terminals of all of the flip-flops 108 through 113 are connected to a voltage source 115 to present an initial condition voltage to these terminals such that stray signals cannot change the state of the flip-flops 108 through 113 except through the "RD" terminal of flip-flop 108. The bottle presence flip-flops 108 through 113 receive their only informational input signal via the electrical wiring 60 into the "RD" terminal of the first flip-flop 108 from the bottle presence switch 61. An input dropping resistor 107 is connected to the "RD" terminal of the flip-flop 108 to ensure that a signal from the switch 61 is not transmitted to the other flip-flops 109–113. Thus, as a container 12 moves from position 1 to position 2 on the rotatable disk 10, a signal is generated by the switch 61 and transmitted to the first flip-flop 108 setting the condition of the flip-flop 108 to zero. Again, it should be noted that the initial condition input voltage source 114 would normally retain the state of the flip-flop 108 in the "on" or one state. However, the "RD" terminal allows overriding the input source 114 and will thus accept the signal from the bottle presence switch 61. It will be noted in FIG. 4 that the output of the bottle presence switch 61 is actually grounded, thus presenting a ground signal to the "RD" terminal and overcoming the initial condition voltage of the voltage source 115 and allowing the flip-flop 108 to assume the zero or "off" state. Then, as was the case with the series of flip-flops 92 through 97, the bottle presence information is transmitted in sequence from the flip-flops 108 through 113 as the input clocking pulses occur. It will be noted that the clock terminals or "C" terminals of the flip-flops 108 through 113 are directly connected to the outputs of the clock delay circuits 106 used for clocking the flip-flops 92 through 97. Thus, the bottle presence information proceeds at the same clock rate as does the defective bottle information in the first memory circuit. The bottle presence signal is transmitted from the "Q" output terminals of the flip-flops 108 through 113 into the reject signal conditioning units 101 through 104 through suitable electrical wiring means 117 through 121. It is not necessary to continue the transmission of the bottle presence signal into the conveyor memory since bottle presence is a prerequisite for having reject information in the defective bottle memory chain.

The final of the three parallel memory systems which make up the machine memory 38 is a series connected six-stage flip-flop system which is used to retain information about specific containers 12 that are to be saved for further analysis. That is, given the first two memory systems made up of the flip-flops 92 through 97 and the flip-flops 108 through 113, defective containers 12 would simply be rejected when they reached a rejection point. However, under some circumstances, it may be desirable to save specific containers 12 which are rejected by a particular one or more of the five rejection stations carried by the inspection apparatus 9. Thus, the selector switch 58 is provided to allow a signal to be placed into one of six series connected flip-flops 124 through 129, which make up the bottle save memory. Again, the flip-flops 124 through 129 are identical to the flip-flops 108 through 113 and 92 through 97. A voltage source 130 is connected to the "S" terminal of the first flip-flop 124 and is used to create an initial condition in the flip-flop 124 of an "on" or one state. The "R" terminal of the first flip-flop 124 is again grounded. The "SD" terminals of all of the flip-flops 124 through 129 are connected to a voltage source 132 which prevents the entry of any signal into these particular terminals. In addition, the source 132 is also connected to the "RD" terminal of the final flip-flop 129, since no informational signal will be received by this particular unit. Again, the flip-flops 124 through 129 are connected in common with the clock input line 55 and the clock delay circuits 106 to ensure that the clocking pulses for all three of the units of flip-flops 92 through 97, 108 through 113, and 124 through 129 process information from stage to stage at the same rate. The input to the "RD" terminal of the flip-flops 124 through 128 is from reject signal conditioning units 134, 135, 136, 137 and 138. The reject signal conditioning units 134 through 138 are identical in electrical configuration to the reject signal conditioning units 100 through 104 (see FIG. 25). One of the inputs to the reject signal conditioning units 134 through 138 is the signal from the "Q" output terminals of the flip-flops 108 through 112 which contain the bottle presence information. Defective bottle information is transmitted to the selector switch 58 from the defective bottle signal lines 56a through e by input wiring 57a through e. The output of the selector switch 58 is connected to the reject signal conditioning units 134 through 138 through output wiring 59a, 59b, 59c, 59d and 59e. The selector switch 58 is of a sliding wire type which allows any one of the input lines 57a through e to be connected to its respective output line 59a through e. However, it should be realized that more than one selector switch 58 could be used to allow "saving" containers 12 rejected from more than one inspection station. In the configuration shown in FIG. 4, the defective bottle information carried by the input wiring 57c is connected to its respective output wire 59c. 59c, in turn, is connected to the signal conditioning unit 136, which is connected to the "RD" terminal of the flip-flop 126. This, then, means that should a defective bottle signal be transmitted from the station indicated as 4 on the rotatable disk 10, the signal will be transmitted through the input wire 57c to the output wire 59c and, in turn, to the reject signal conditioning unit 136. This signal then, assuming that a bottle presence signal is received from the flip-flop 110, will be transmitted to the "RD" terminal of the flip-flop 126. This will reset the condition of the flip-flop 126 and cause the signal to be propagated to the flip-flops 127, 128 and 129 in turn as the proper clocking signal is received. This information is then fed to the conveyor memory 40 through the output line 66.

At this point, it is necessary to understand that the machine memory 38 and the conveyor memory 40 do not necessarily operate at the same clocking rate. That is, the speed of operation of the gauging apparatus 9 does not have a direct correlation with the speed of the conveyor 14. This means that the two memory systems 38 and 40 must have independent clocking input pulses to retain the position of a defective container 12 for proper rejection. Thus, a transfer must be made of the information contained within the machine memory 38 to the conveyor memory 40 at a point where the two systems are coincident. The only position at which this occurs in the entire cycle is when a container 12 is in the output position designated as 7 of the rotatable disk 10. At this point, the information contained in the flip-flop 97 and any information in flip-flop 129 is transferred to the conveyor memory 40.

Figure 5:
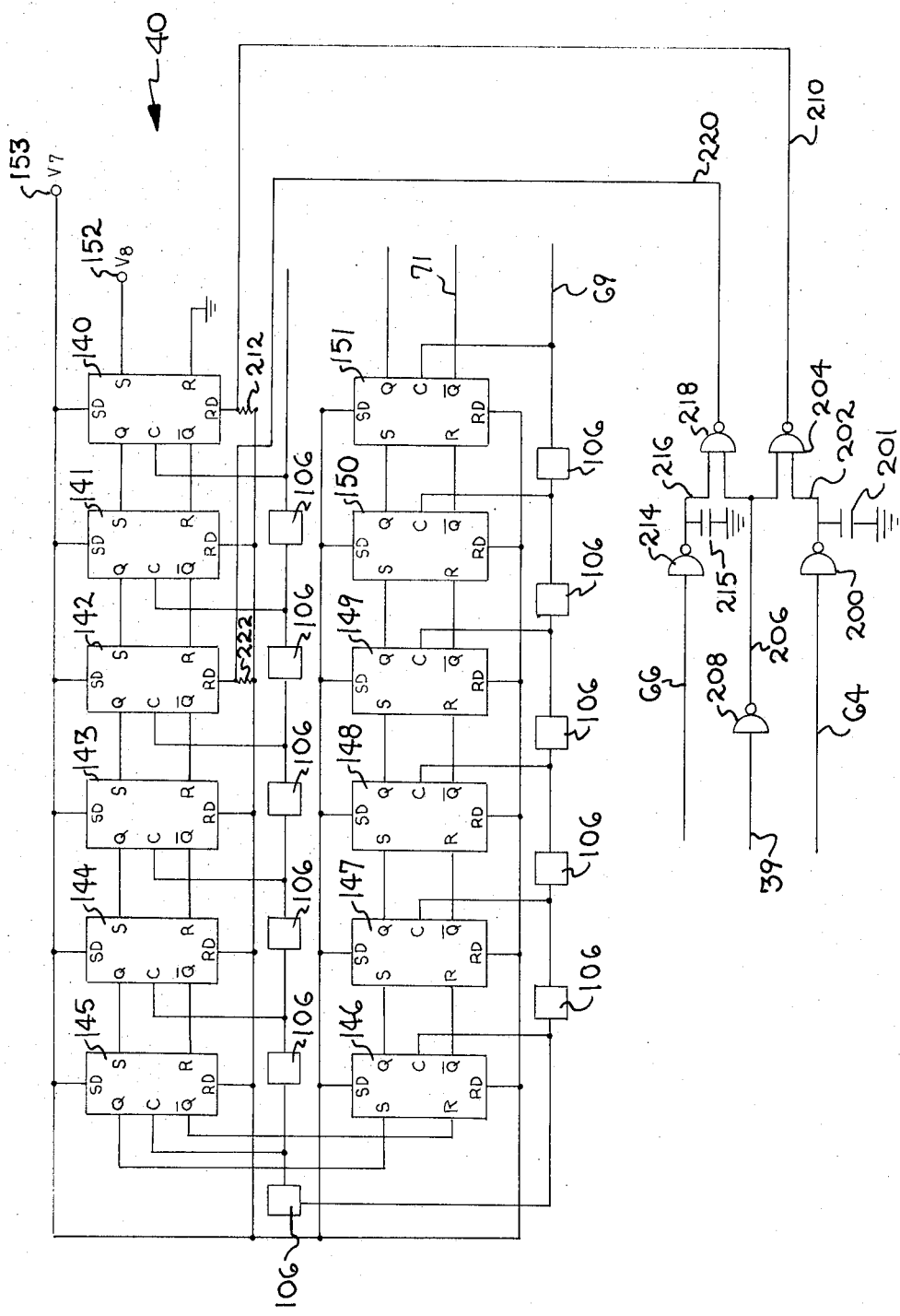
FIG. 5 is a schematic circuit diagram of the conveyor memory of FIG. 1.

FIG. 5 illustrates the circuit of the conveyor memory 40. The circuit itself will be explained first and then the functioning of the circuit and the memory transfer function will be explained later in detail. The conveyor memory 40 is shown as a 12-stage flip-flop type shift register, having 12 identical flip-flops 140 through 151 connected in series. The flip-flops 140 through 151 are identical to the flip-flops previously described and used in the machine memory 38. It should be understood that the use of 12 flip-flops 140 through 151 for the conveyor memory 40 is a matter of convenience. It would be possible to use fewer than 12 flip-flops or more than 12 flip-flops, depending on the downstream position at which it was desired to reject or save a defective container 12. It will first be noted that the "S" terminal of the first flip-flop 140 is given an initial condition by the use of an input voltage source 152. Again, the "R" terminal of the flip-flop 140 is grounded, thus placing the flip-flop 140 in the "on" or one state. All of the "SD" and "RD" terminals of the flip-flops 140 through 151 are connected to a voltage source 153, which again is used to prevent accidental switching of the states of any of the flip-flops. The defective bottle information transmitted by the output line 64 first goes through an inverting NAND gate 200 in the conveyor memory 40. The output of the NAND gate 200 is carried by wiring 202 to a summing NAND gate 204. The other input to the NAND gate 204 is a wire 206 which carries the gauging signal which has been inverted by an inverting NAND gate 208. A delay capacitor 201 is interposed in the line 202 between the NAND gate 200 and the NAND gate 204. The delay capacitor 201 delays the arrival of the defective bottle information at the summing NAND gate 204 slightly to allow the gauging signal (transmitted through the line 39) to become stable before transferring information into the conveyor memory 40. When both inputs into the summing NAND gate 204 are "1" or high, the output of the NAND gate 204 will be zero or low. This signal is transmitted via wiring 210 to the "RD" terminal of the flip-flop 140. An input dropping resistor 212 ensures that any signal from the line 210 will not be propagated to the other flip-flops in the conveyor memory 140. The information that a bottle 12 is to be saved is entered through the line 66, and is treated in an identical manner using an inverting NAND gate 214, an output 216 from the gate 214, a delay capacitor 215, a summing NAND gate 218, an output line 220 from the gate 218 connected to the "RD" terminal of the flip-flop 142, and an input dropping resistor 222. It will be noted that the save information is not transmitted to the second flip-flop in the series connection, 141, but rather is transmitted to the third flip-flop 142. The purpose of this wiring arrangement will become obvious when the transfer of memory function is described later. The conveyor clock input pulse is transmitted via the line 69 as previously described. This pulse is first transmitted to the last flip-flop in the series connection 151. Again, a plurality of clock delay circuits 106 are interposed between the various flip-flops to ensure that the clock signal does not arrive at any one of the flip-flops 140 through 151 until the flip-flop has been able to read the information contained within the preceding flip-flop. Finally, the output of the last flip-flop 151 is transmitted via the output signal line 71 to the solenoid valve 70 which controls the functioning of the reject and save mechanism.

Figure 6:
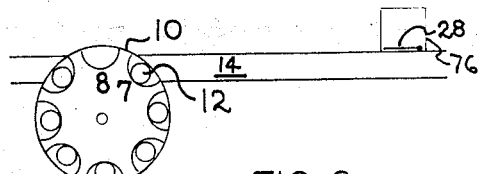
FIGS. 6-21 illustrate, in a schematic form, the progress of a defective article along the article conveyor from the inspection machine to a rejection means.
Figure 6A:
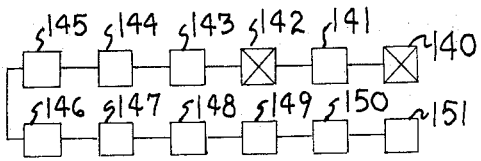
Figure 7:
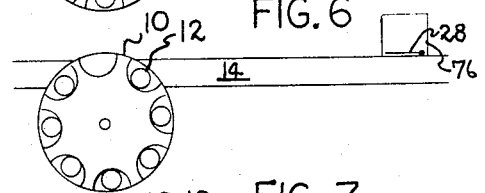
Figure 7A:
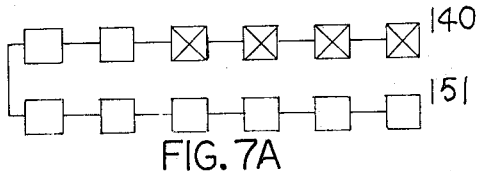
Figure 8:
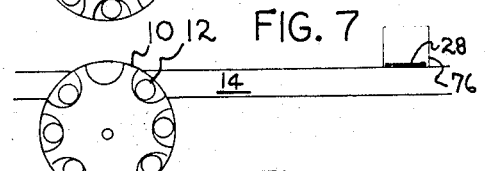
Figure 8A:
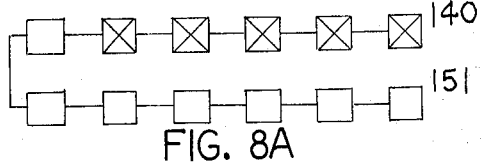
Figure 9:
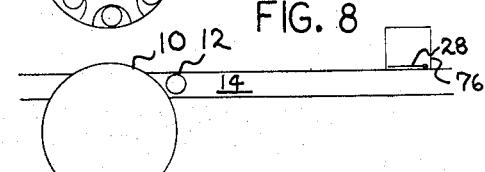
Figure 9A:
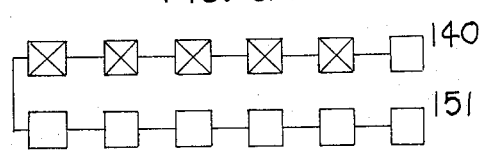
Figure 10:
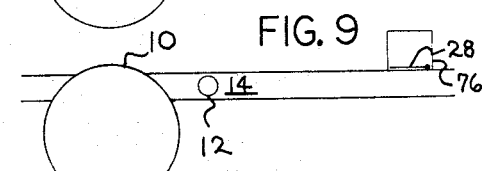
Figure 10A:
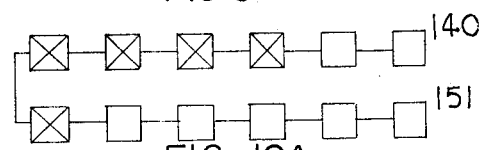
Figure 11:
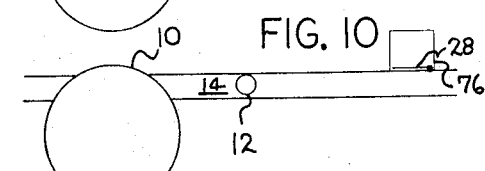
Figure 11A:
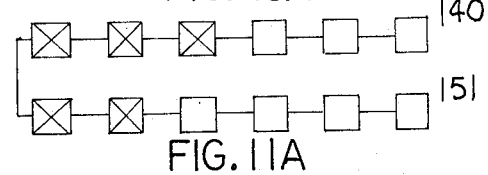
Figure 12:
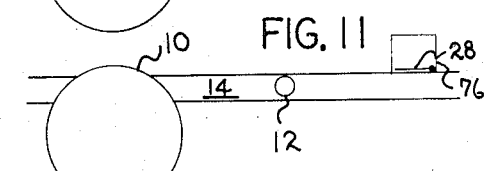
Figure 12A:
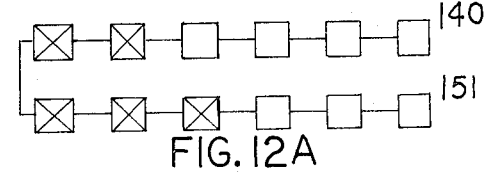
Figure 13:
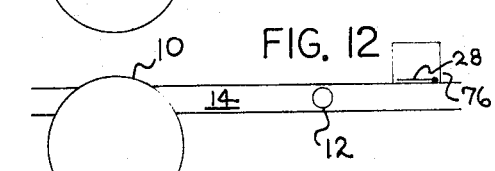
Figure 13A:
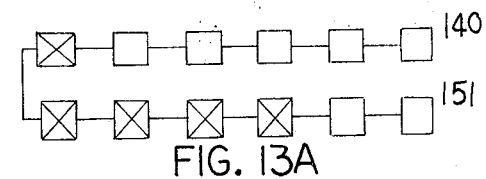
Figure 14:
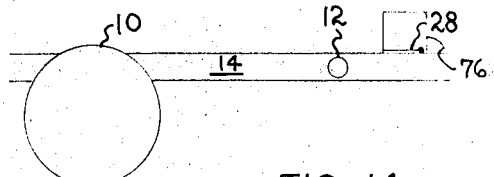
Figure 15:
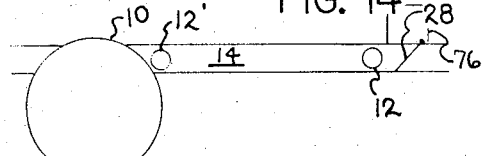
Figure 16:
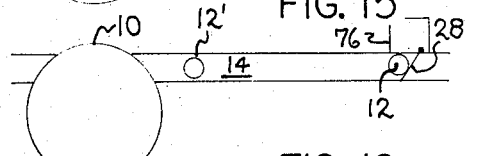
Figure 17:
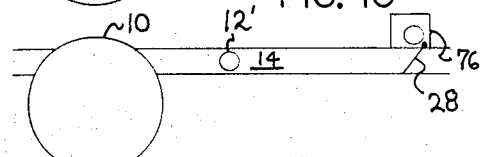
Figure 18:
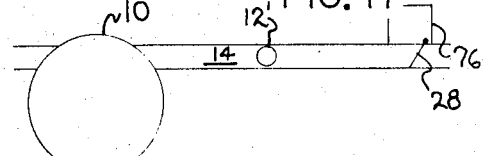
Figure 19:
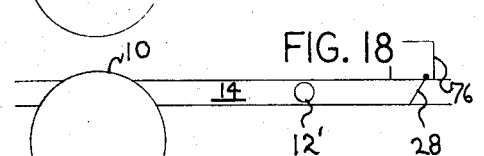
Figure 15A:
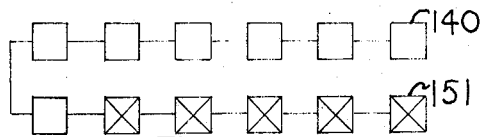
Figure 16A:
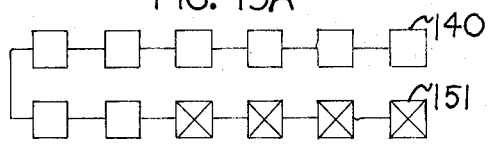
Figure 17A:
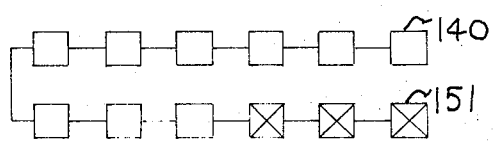
Figure 18A:
Figure 19A:
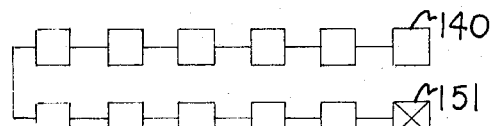

The transfer of information from the machine memory 38 to the conveyor memory 40 and the save the reject functions of the conveyor memory 40 are shown in schematic form in FIGS. 6 through 21 and FIGS. 6A–21A. The conveyor memory 40 flip-flops 140 through 151 are simply shown as blocks in FIGS. 6A through 21A. An "X" in one of the blocks indicates that information is present in that particular flip-flop 140 through 151. It will be understood that the presence of the mark in the block representing the flip-flop is generally taken to indicate the flip-flop as being in the "on" state. However, as previously explained, the logic of this particular system operates in such a mode that the presence of information is indicated by the flip-flop being in the "off" state. However, those skilled in the art will readily recognize that the choice of this particular logic configuration is simply a matter of convenience, and the entire system could be readily operated in such a mode that the presence of information could be indicated by the flip-flop being in the "on" state. It is believed that the understanding of the functioning of the memory transfer and the reject function will be facilitated by representing the presence of information with an "X" in the blocks representing the flip-flops 140 through 151. Beginning with FIGS. 6 and 6A, the configuration shown is that immediately after the container 12 has been indexed to the final or output station 7 by the rotatable disk 10. At this point, assume that the container 12 in position 7 has exhibited some defect and it is desired to save this particular container 12. Thus, the machine memory 38 received a clock pulse during the transfer of the container 12 from position 6 to position 7 (see FIG. 28). The receipt of the gauging pulse by the NAND gate 208 caused the flip-flops 97 and 129 to read their information into the flip-flops 140 and 142 as shown in FIG. 6A. Thus, information is present in flip-flops 140 and 142. As indicated on the wave form drawings (see FIG. 28), the conveyor clock pulses continue at a constant rate even during the inspection apparatus 9 gauging cycle when there are no clock pulses to the machine memory 38. Thus, FIGS. 7A and 8A show that clock pulses to the conveyor memory 40 cause the information output from the flip-flops 97 and 129 to be repeated into conveyor flip-flops 140 and 142 during the gauging cycle. Therefore, as shown in FIG. 8A, a total of five flip-flops 140 through 144 are in the information indicating state at the end of the machine gauging cycle. In FIG. 9, the container 12 has begun to move down the conveyor 14. It is assumed that the next container placed in position 7 was not a defective container, and thus no defect information was carried by the flip-flop 97 to be transferred to the flip-flop 140. At this point then, the conveyor memory 40 has left the influence of the machine memory 38 and no further information pulses will enter the conveyor memory 40. Therefore, as shown in FIG. 9A, the next conveyor clock pulse will move the information down one step in the flip-flop shift register. This will leave the flip-flop 140 blank, and the flip-flops 145 through 141 will be carrying information. It should now be apparent that the information relating to the container 12 is carried in a block of flip-flops, in this case five in number. Therefore, the positioning of the container 12 on the conveyor 14 is not particularly critical at this stage. This is important, since the conveyor 14 will not always convey a container 12 at identically reproducible positions. There may be some slip between the conveyor 14 and a particular container 12 leading to some positional variation of containers 12 on the conveyor 14. By allowing the reject function to take place over a time span, the positional variations of the container 12 on the conveyor 14 may be compensated for. FIGS. 10 through 14 and FIGS. 10A through 14A illustrate the movement of the information relating to the container 12 through the various flip-flops as the container 12 is conveyed toward the rejection point. It should be realized that during this time, the rotatable disk 10 is indexing, moving a new container 12' into the output position 7 and inspecting additional containers. FIGS. 15 and 15A illustrate that, at the time that a new container 12' is released to the conveyor 14, the defective bottle information has reached the final stage in the conveyor memory 40, namely the flip-flop 151, and has produced an output pulse on the output line 71 to the solenoid valve 70. It should be recognized that, depending on the speed of the gauging apparatus 9 and the number of flip-flops in the conveyor memory 40, it might be possible to have a plurality of containers 12 between the gauging apparatus 9 and the moveable section 28 on the conveyor 14. The pulse, in turn, opens the moveable section 28. As the container 12 continues to move forward, the train of pulses through the flip-flop 151, moved by the clocking pulses through the conveyor memory 40, hold the moveable section 28 open. When the container 12 reaches the moveable section 28, it is deflected off of the conveyor 14 and into the holding bin 76. It will be noted, in FIG. 6A, that the initial informational pulses were placed in the flip-flops 140 and 142. By placing the bottle save information in the flip-flop 142, a lead time of at least two conveyor clock pulses was obtained. This allowed the moveable section 28 to open before the conveyor 12 reached the rejection position. Had the information to save not been placed in the flip-flop 142, FIG. 6A would simply have shown an informational bit in the flip-flop 140. Thus, there would have been a train of only three pulses rather than the train of five pulses as shown. It may thus be appreciated that the moveable section 28 would not open until the time shown in FIGS. 17 and 17A. In such a situation, the defective container 12 would have been forcibly swept through the opening 27 in the guide rails 26 and onto the rejection conveyor 34 by the moveable section 28.

Figure 20:
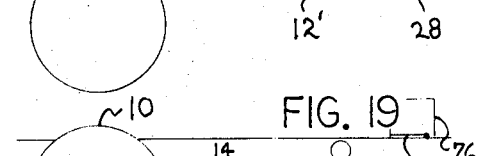
Figure 21:
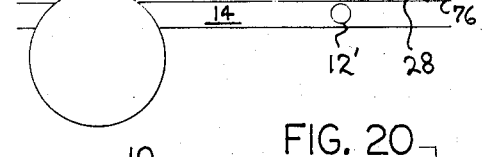
Figure 14A:
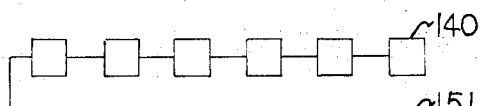
Figure 20A:
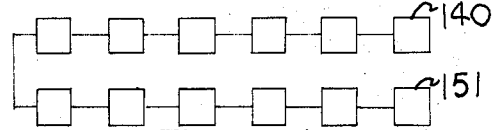
Figure 21A:
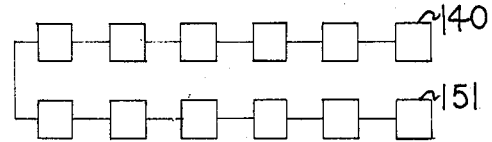

Continuing now, it may be seen that the moveable section 28 will remain open in FIGS. 18, 19, 18A, and 19A, even though the defective container 12 has already been diverted into the holding bin 76. In addition, the container 12' released after the defective container 12 has been steadily moved by the conveyor 14 toward the rejection point. However, before the second container 12' can reach the rejection point, as shown in FIGS. 20 and 20A, the train of informational pulses ends and the moveable section 28 closes. Thus, it can easily be seen in FIGS. 21 and 21A that the second container 12' will pass by the rejection point without being diverted from its path of travel.

Figure 27:
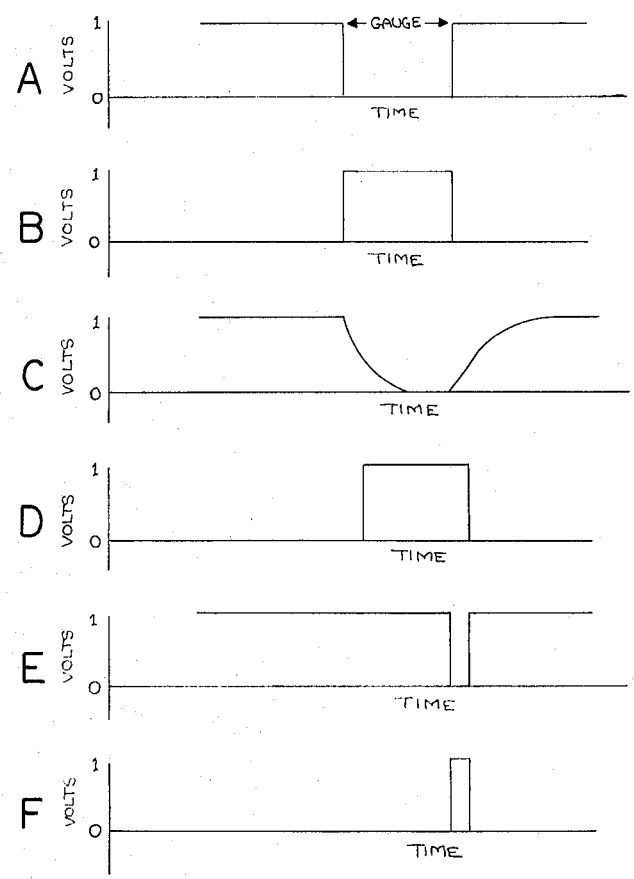
FIG. 27 is a graph showing a series of wave forms to illustrate the generation of the machine memory clock pulse.

The clock pulse for the machine memory 38 and the circuit for generating the clocking pulse may be seen with reference to FIGS. 23 and 27. FIG. 27 is a series of wave forms showing the actual generation of the clocking pulse, which is designated as wave form F. It will be noted that the voltage levels are designated in the logic manner as either 1 or 0 in FIG. 27. As previously discussed, the gauging switch 41 is in the "on" position during the actual gauging cycle as illustrated by wave form A in FIG. 27. The machine clock generator 54 shown in FIG. 23 has, as an input, the wave form A from the gauging switch 41. A noise suppression capacitor 155 is connected in parallel with the gauging switch 41. A voltage source 156 feeding through a resistor 157 serves as the power input for the gauging switch 41. As seen in FIG. 23, the wave form A appears at the input to the machine clock generator 54. A first NAND gate 158 receives the gauging pulse A and inverts it to give a positive going pulse designated as wave form B. The wave form B is then connected to a second inverting NAND gate 159 which will reinvert the wave form B. However, a delay capacitor 160 is interposed in the path of travel of the wave form B and must be discharged before the signal can be propagated from the second inverting NAND gate 159 to a third inverting NAND gate 161. The delay capacitor 160, which is grounded, has a particular discharging curve characteristic which causes the output of the second NAND gate 159 to assume the wave form shown as C in FIG. 27. The result of the delay characteristics is that the switching level required to turn the NAND gate 161 on is not reached until a short period of time after the wave form B has reached the second NAND gate 159. This may be seen in FIG. 27 as wave form D. Specifically, note that wave form D is displaced slightly to the right in FIG. 27 from the "on" time shown for wave form B. A fourth NAND gate 162 has as its input the wave form D as well as the wave form A. It is the fourth NAND gate 162 which actually performs the final shaping function of the machine memory clock pulse. It will be recalled at this point that the wave form D has been generated and is in the "on" condition. When the gauging cycle has ended, the wave form A will again raise to the "high" or "one" value. This will immediately cause the wave form B to drop to the "low" or "zero" value. However, the propagation of the wave form B from the NAND gate 159 will be delayed by the delay capacitor 160. In this case, the time at which the NAND gate 161 will be turned off will be delayed a short period of time after the NAND gate 159 has been turned off. The net result is that the total wave form D is slightly displaced to the right of the wave form B. In addition, the wave form designated as E in FIG. 27, which is generated by the NAND gate 162, may be generated only during a very short period of time when both the wave form A and the wave form D are in their "high" or "one" condition. It will be recalled again that the combination of the wave forms D and C cause the wave form D to slightly lag the turning on of the gauging switch 41. This means that a short period of time after the gauging cycle has ended and when the transfer cycle has begun, the wave form A and the wave form D will both be in the "high" or "one" condition. The characteristics of a NAND gate, as is well known, are such that there will be a zero output only when both inputs are one. Therefore, the very short pulse E is generated as the output of the NAND gate 162. A fifth NAND gate 164 is used to invert the wave form E to give the wave form F, which is actually the clocking pulse. The NAND gate 164 is necessary since the flip-flops used in the logic system require the falling edge of a positive going clock pulse for operation and consequently the wave form E must be inverted to give the wave form F, displaced in time from the end of the gauging cycle. It should now be realized that the clocking pulse F is generated only after the gauging cycle has been completed. This ensures that any defective bottle information has been transmitted to the machine memory 38 before the clocking pulse F may be received by the machine memory 38 to transfer such information to the next stage in the machine memory 38. In effect, the clocking pulse F is triggered by the rising edge of the end of the gauging cycle.

Keeping in mind the foregoing description, the conveyor clock pulse generator 65 as shown in FIG. 22, it may be seen that the conveyor clock pulse generator 65 is essentially identical to the machine clock pulse generator 54. The operations performed on the incoming signals are identical and the output pulse is identical in the sense that the output clock pulse is a shaped, relatively narrow pulse for the clocking function. In the case of the conveyor clock pulse generator 65, the input signal is through the line 67 connected to the conveyor signal generator 68. It is believed that the discussion of the machine clock pulse generator 54 is sufficient to allow a simple description of the components of the conveyor clock pulse generator 65 without giving the details of the actual shaping of the clocking pulse. The signal from the conveyor signal generator 68 is first amplified with a signal amplifier 166. Then, the signal passes through five identical NAND gates 168, 169, 170, 171 and 172. Additionally, a grounded delay capacitor 174 is placed in circuit between the NAND gates 169 and 170. The NAND gate 171, as was seen with respect to the NAND gate 162, has two inputs. One input is the amplified conveyor signal and the other input is from the NAND gate 170. FIG. 28 illustrates a plurality of gauging pulses A, machine memory clock pulses F, and conveyor clock pulses which are designated as wave form G. The illustration of FIG. 28 is on a common time base, so that the relationship between the occurrence of the gauging pulses A, the machine memory clock pulses F and the conveyor memory clock pulses G may be readily seen. It may now be appreciated, by reference to FIG. 28, that a number of conveyor clock pulses G may occur during the actual gauging period. However, only one machine memory clock pulse occurs for each unique gauge period. Thus, the previously explained movement of information in the conveyor memory during the actual gauging period may now be appreciated.

FIGS. 24 and 25 illustrate two typical reject signal conditioning units 100 and 134. The unit 100 may be considered typical of the units 100 through 105, and the unit 134 may be considered typical of the units 134 through 138. The unit 100 receives one input signal through the wire 56A connected to the bottle defect logic unit 38. An additional input is through the wire 117 connected to the Q terminal of one of the bottle presence flip-flops 108. The signal transmitted on the line 117 is sent through an inverting NAND gate 176 which changes the "zero" level signal from the Q terminal to a "one" level signal. The "one" level signal is then transmitted into a NAND gate 178 where it is combined with the signal carried by the wire 56A. The logic of the bottle inspection apparatus is such that defective bottle information is in a "one" condition. Thus, if both inputs into the NAND gate 178 are one, the output of the NAND gate 178 will be zero. This "zero" signal is then fed to the RD terminal of the flip-flop 92 to indicate the presence of a defective container. In the reject signal conditioning unit 134, the bottle presence signal is again introduced through the wiring 117. Once again, this signal is inverted by a NAND gate 180. In this configuration, any input into the second NAND gate 182 is through the wiring 59A. It will be recalled that the wire 59A is a part of the array 59A through 59E which is the output of the selector switch 58. As with the reject signal conditioning unit 100, the NAND gate 182 will give an output if both the signal out of the NAND gate 180 and the signal in the wire 59A are on or in the "one" condition. In this case, the output of the reject signal conditioning unit 134 is fed to the RD terminal of the flip-flop 124 in the bottle save memory.

Finally, FIG. 26 illustrates one of the plurality of clock delay circuits 106. Each clock delay circuit is made up of two NAND gates 184 and 185 connected in series. The input to the first NAND gate 184 is the clock wave pulse F, which is transmitted on the wire 55. The first NAND gate 184 inverts the clock wave form F and, if it were not for a grounded delay capacitor 186 interposed between the NAND gates 184 and 185, the pulse would simply be reinverted by the NAND gate 185 to its original form. However, the delay capacitor 186 delays propagation of the clock pulse from the NAND gate 184 to the NAND gate 185 as was previously illustrated in FIGS. 27 and 23 with respect to the delay capacitor 160. The net result is that the propagation of the machine memory clock pulse is delayed slightly between flip-flop stages to allow the transfer of information from one stage to the next before the clock pulse clears that particular stage of the flip-flop. The clock pulse, after the delay imparted by the delay capacitor 186, leaves the clock delay circuit 106 in an identical form and pulse width as that in which it entered the clock delay circuit 106, but its time interval has been extended beyond that which would occur if the clock delay circuits 106 were not interposed in the path of the machine memory clock pulses.

What I claim is:

1. Apparatus for inspecting and segregating articles comprising, in combination:
   conveyor means for moving said articles in single file;
   an article inspection machine located adjacent said conveyor means for receiving said articles one at a time therefrom, serially indexing said articles through a plurality of inspection stations, and releasing inspected articles to said conveyor means;
   an article defect logic and detection means connected to said plurality of inspection stations for generating one or more output signals if an article is defective in one or more aspects, said article defect logic and detection means having a plurality of output leads at least equal in number to the number of said inspection stations;
   a rejection means adjacent said conveyor means, downstream of said inspection machine, for removing defective articles from said conveyor means;
   first clock means for generating a series of machine clock pulses in synchronism with the index cycle of said inspection machine;
   first memory means connected to said article defect logic and detection means and to said first clock means for storing defective article information generated by said article defect logic and detection means and for shifting said information in response to said machine clock pulses of said first clock means in synchronism with the index of said article from inspection station to inspection station;
   second clock means for generating a series of conveyor clock pulses in synchronism with the speed of travel of said conveyor means, the frequency of said machine clock pulses and said conveyor clock pulses being independent of one another; and
   second memory means connected to said second clock means, said first memory means and said rejection means for receiving defective article information from said first memory means as said article is released to said conveyor means, for shifting said information in response to said conveyor clock pulses in synchronism with the movement of said article along said conveyor means, and for actuating said rejection means as said article reaches said rejection means to thereby reject a defective article.

2. The apparatus of claim 1, further including:
   selector means connected to said article defect logic and detection means for choosing one of said inspection stations to provide an output from selector means when a defective article is present at said inspection station; and
   third memory means connected to said first clock means, said first memory means, said selector means and said second memory means for receiving defective article information from said selector means, for shifting said information in response to said machine clock pulses of said first clock means in synchronism with the index of said defective article from inspection station to inspection station, and for inserting said information in said second memory means in a position leading the position wherein the same information is inserted in said second memory means by said first memory means.

3. The apparatus of claim 2, wherein said first memory means comprises, in combination:
   a first plurality of flip-flops connected in series to form a shift register, said plurality of flip-flops being at least equal in number to the number of inspection stations;

a second plurality of flip-flops connected in series to form a shift register, said second plurality of flip-flops being at least equal in number to the number of said first plurality of flip-flops;

means connected to said first and second plurality of flip-flops for setting an initial condition in all of said first and second plurality of flip-flops;

an article presence switch adjacent said article inspection machine, connected to the first one of said second plurality of flip-flops, for overcoming the initial condition of said first one of said second plurality of flip-flops when an article is present for inspection;

a first plurality of independent signal conditioning means, each of said first plurality of signal conditioning means having one input respectively connected to one of said plurality of output leads from said article defect logic and detection means, for resetting said first plurality of flip-flops;

means for connecting the output of said first plurality of signal conditioning means respectively to an input of individual ones of said first plurality of flip-flops; and means for connecting the outputs of said second plurality of flip-flops respectively to a second input of each of said first plurality of signal conditioning means, whereby said first plurality of signal conditioning means will reset said one of said first plurality of flip-flops only when a defective article is detected and when said second plurality of flip-flops indicates the presence of an article at the inspection station where the defective article is detected.

4. The apparatus of claim 3, wherein said third memory means comprises, in combination:

a third plurality of flip-flops connected in series to form a shift register, said third plurality of flip-flops being at least equal in number to the number of inspection stations;

means connected to said third plurality of flip-flops for setting an initial condition in all of said third plurality of flip-flops;

a second plurality of independent signal conditioning means, each of said second plurality of signal conditioning means having one input respectively connected to one of the outputs of said selector means, for resetting said third plurality of flip-flops;

means for connecting the output of said second plurality of signal conditioning means respectively to an input of individual ones of said third plurality of flip-flops; and means for connecting the outputs of said second plurality of flip-flops respectively to a second input of each of said second plurality of signal conditioning means, whereby said second plurality of signal conditioning means will reset said one of said third plurality of flip-flops only when a defective article is detected at the inspection station connected to one of said second plurality of signal conditioning means through said selector means and when said second plurality of flip-flops indicates the presence of an article at the inspection station where the defective article is detected.

5. The apparatus of claim 3, wherein each of said first plurality of signal conditioning means comprises, in combination:

a first NAND gate having its input side connected to one of said second plurality of flip-flops; and a second NAND gate having one input connected to the output of said first NAND gate and having a second input connected to said article defect logic and detection means, and having its output connected to one of said first plurality of flip-flops.

6. The apparatus of claim 4, wherein each of said second plurality of signal conditioning means comprises, in combination:

a first NAND gate having its input side connected to one of said second plurality of flip-flops; and a second NAND gate having one input connected to the output of said first NAND gate and having a second input connected to said selector means, and having its output connected to one of said third plurality of flip-flops.

7. The apparatus of claim 2, wherein said first clock means includes means for generating a signal during the gauging cycle, and said second memory means comprises, in combination:

a plurality of flip-flops connected in series to form a shift register;

means connected to said plurality of flip-flops for setting an initial condition in all of said flip-flops;

signal conditioning means having one output connected to the first one of said plurality of flip-flops and a second output connectd to a subsequent one of said flip-flops for resetting said first one and said subsequent one of said flip-flops when a signal is presented by said first memory means and said third memory means and when said gauging signal is present or for resetting only said first one of said flip-flops when a signal is presented only by said first memory means and said gauging signal is present;

means for connecting the output of said third memory means to a first input of said signal conditioning means;

means for connecting said gauging signal to a second input of said signal conditioning means; and means for connecting the output of said first memory means to a third input of said signal conditioning means.

8. The apparatus of claim 7 wherein said signal conditioning means comprises, in combination:

a first NAND gate having its input connected to said first input of said signal conditioning means;

a second NAND gate having its input connected to said second input of said signal conditioning means;

a third NAND gate having its input connected to said third input of said signal conditioning means;

a fourth NAND gate having one input connected to the output of said first NAND gate and having a second input connected to the output of said second NAND gate, and having its output connected to said subsequent one of said plurality of flip-flops;

a first delay capacitor connected in circuit between said first NAND gate and said fourth NAND gate for delaying the propagation of a signal from said first NAND gate to said fourth NAND gate;

a fifth NAND gate having one input connected to the output of said third NAND gate and having a second input connected to the output of said second NAND gate, and having its output connected to said first one of said plurality of flip-flops; and a second delay capacitor connected in circuit between said third NAND gate and said fifth NAND gate for delaying the propagation of a signal from said third NAND gate to said fifth NAND gate.

9. The apparatus of claim 1, wherein said first clock means includes:
   means for generating a signal during the gauging cycle;
   a first NAND gate connected to said means for generating a signal;
   a second NAND gate connected to the output of said first NAND gate;
   a third NAND gate connected to the output of said second NAND gate;
   a delay capacitor connected in circuit between said second and third NAND gates for delaying the propagation of a signal from said second to said third NAND gate;
   a fourth NAND gate connected to the output of said third NAND gate and to said means for generating a signal; and
   a fifth NAND gate connected to the output of said fourth NAND gate, whereby the output of said fifth NAND gate is a machine clock pulse in synchronism with the index cycle of said inspection machine.

10. The apparatus of claim 1, wherein said second clock means includes a signal generator for generating a signal proportional to the speed of said conveyor means.

11. The apparatus of claim 10, wherein said conveyor signal generator comprises, in combination:
   a substantially U-shaped housing mounted adjacent said conveyor means;
   an opaque code wheel having a plurality of openings extending therethrough, located at a common radial distance from the axis of said code wheel;
   means for rotatably mounting said code wheel between the legs of said housing with its periphery in contact with said conveyor means, whereby said code wheel will rotate in proportion to the linear travel of said conveyor means;
   a light source positioned on the interior of one leg of said housing adjacent said disk at substantially the same radius as that of said openings; and
   a photoelectric sensor positioned on the leg of said housing opposite said light source in alignment with said light source, whereby said photoelectric sensor will generate an output signal whenever one of the openings in said code wheel rotates past said light source.

12. The apparatus of claim 10 wherein said second clock means includes: a signal amplifier connected to said signal generator; a first NAND gate connected to the output of said signal amplifier; a second NAND gate connected to the output of said first NAND gate; a third NAND gate connected to the output of said second NAND gate; a delay capacitor connected in circuit between said second and third NAND gates for delaying the propagation of a signal from said second NAND gate to said third NAND gate; a fourth NAND gate connected to the output of said third NAND gate and to the output of said signal amplifier; and, a fifth NAND gate connected to the output of said fourth NAND gate, whereby the output of said fifth NAND gate is a conveyor clock pulse in synchronism with the speed of travel of said conveyor means.

13. The apparatus of claim 1, wherein said first clock means includes means for generating a signal during the gauging cycle, and said second memory means comprises, in combination:
   a plurality of flip-flops connected in series to form a shift register;
   means connected to said plurality of flip-flops for setting an initial condition in all of said flip-flops;
   signal conditioning means having its output connected to the first one of said plurality of flip-flops for resetting said flip-flop when a signal is presented by said first memory means and when said gauging signal is present;
   means for connecting the output of said first memory means to a first input of said signal conditioning means; and
   means for connecting said gauging signal to a second input of said signal conditioning means.

14. The apparatus of claim 13 wherein said signal conditioning means comprises, in combination:
   a first NAND gate having its input connected to said first input of said signal conditioning means;
   a second NAND gate having its input connected to said second input of said signal conditioning means;
   a third NAND gate having one input connected to the output of said first NAND gate and having a second input connected to the output of said second NAND gate, and having its output connected to said first one of said plurality of flip-flops; and
   a delay capacitor connected in circuit between said first NAND gate and said third NAND gate for delaying the propagation of a signal from said first NAND gate to said third NAND gate.

15. A memory system for an article inspection machine which removes articles one at a time from a continually moving article conveyor, serially indexes the articles through a plurality of inspection stations, and returns inspected articles to said conveyor, and wherein said inspection machine includes article defect logic and detection means having a plurality of output leads for generating a signal if an article is defective in one or more aspects, comprising the combination of:
   rejection means adjacent said conveyor downstream of said inspection machine for removing defective articles from said conveyor;
   first clock means for generating a series of machine clock pulses in synchronism with the index cycle of said inspection machine;
   first memory means connected to said article defect logic and detection means and to said first clock means for storing defective article information generated by said article defect logic and detection means and for shifting said information in response to said machine clock pulses of said first clock means in synchronism with the index of said article from inspection station to inspection station;
   second clock means for generating a series of conveyor clock pulses in synchronism with the speed of travel of said conveyor, the frequency of said machine clock pulses and said conveyor clock pulses being independent of one another; and
   second memory means connected to said second clock means, said first memory means, and said reject means for receiving defective article information from said first memory means as said article is returned to said conveyor, for shifting said information in response to said conveyor clock pulses in synchronism with the movement of said article along said conveyor, and for actuating said rejection means as said article reaches said reject means to thereby reject a defective article.

16. The apparatus of claim 15, further including:
selector means connected to said article defect logic and detection means for choosing one of said inspection stations to provide an output from said selector meany when a defective article is present at said inspection station; and
third memory means connected to said first clock means, said first memory means, said selector means, and said second memory means for receiving defective article information from said selector means, for shifting said information in response to said machine clock pulses of said first clock means in synchronism with the index of said defective article from inspection station to inspection station, and for inserting said information in said second memory means in a position leading the position wherein the same information is inserted in said second memory means by said first memory means.

17. The apparatus of claim 15, wherein said first memory means comprises, in combination:
a first plurality of flip-flops connected in series to form a shift register, said plurality of flip-flops being at least equal in number to the number of inspection stations;
a second plurality of flip-flops connected in series to form a shift register, said second plurality of flip-flops being at least equal in number to the number of said first plurality of flip-flops;
means connected to said first and second plurality of flip-flops for setting an initial condition in all of said first and second plurality of flip-flops;
an article presence switch adjacent said article inspection machine, connected to the first one of said second plurality of flip-flops, for overcoming the initial condition of said first one of said second plurality of flip-flops when an article is present for inspection;
a first plurality of independent signal conditioning means, each of said first plurality of signal conditioning means having one input respectively connected to one of said plurality of output leads from said article defect logic and detection means, for resetting said first plurality of flip-flops;
means for connecting the output of said first plurality of signal conditioning means respectively to an input of individual ones of said first plurality of flip-flops; and
means for connecting the outputs of said second plurality of flip-flops respectively to a second input of each of said first plurality of signal conditioning means, whereby said first plurality of signal conditioning means will reset said one of said first plurality of flip-flops only when a defective article is detected and when said second plurality of flip-flops indicates the presence of an article at the inspection station where the defective article is detected.

18. The apparatus of claim 17, wherein said third memory means comprises, in combination:
a third plurality of flip-flops connected in series to form a shift register, said third plurality of flip-flops being at least equal in number to the number of inspection stations;
means connected to said third plurality of flip-flops for setting an initial condition in all of said third plurality of flip-flops;
a second plurality of independent signal conditioning means, each of said second plurality of signal conditioning means having one input respectively connected to one of the outputs of said selector means, for resetting said third plurality of flip-flops;
means for connecting the output of said second plurality of signal conditioning means respectively to an input of individual ones of said third plurality of flip-flops; and
means for connecting the outputs of said second plurality of flip-flops respectively to a second input of each of said second plurality of signal conditioning means, whereby said second plurality of signal conditioning means will reset said one of said third plurality of flip-flops only when a defective article is detected at the article inspection station connected to one of said second plurality of signal conditioning means through said selector means and when said second plurality of flip-flops indicates the presence of an article at the inspection station where the defective article is detected.

19. The apparatus of claim 15, wherein said first clock means includes means for generating a signal during the gauging cycle, and said second memory means comprises, in combination:
a plurality of flip-flops connected in series to form a shift register;
means connected to said plurality of flip-flops for setting an initial condition in all of said flip-flops;
signal conditioning means having its output connected to the first one of said plurality of flip-flops for resetting said flip-flop when a signal is presented by said first memory means and when said gauging signal is present;
means for connecting the output of said first memory means to a first input of said signal conditioning means; and
means for connecting said gauging signal to a second input of said signal conditioning means.

20. The apparatus of claim 16, wherein said first clock means includes means for generating a signal during the engaging cycle, and said second memory means comprises, in combination:
a plurality of flip-flops connected in series to form a shift register;
means connected to said plurality of flip-flops for setting an initial condition in all of said flip-flops;
signal conditioning means having one output connected to the first one of said plurality of flip-flops and a second output connected to a subsequent one of said flip-flops for resetting said first one and said subsequent one of said flip-flops when a signal is presented by said first memory means and said third memory means and when said gauging signal is present or for resetting only said first one of said flip-flops when a signal is presented only by said first memory means and said gauging signal is present;
means for connecting the output of said third memory means to a first input of said signal conditioning means;
means for connecting said gauging signal to a second input of said signal conditioning means; and means for connecting the output of said first memory means to a third input of said signal conditioning means.

21. A method for rejecting a defective article downstream of an inspection machine which receives articles one at a time from a conveyor, inspects said articles one at a time at multiple inspection stations, indexes said articles from station to station, generates a defect signal for a defective article, and returns all articles one at a time to said conveyor, comprising the steps of:

loading defective article information relating to a specific defective one of said articles into a first memory means;

shifting said information in said first memory means in synchronism with the index of said defective article by said inspection machine;

transferring said defective article information into a second memory means from said first memory means as said defective article is returned to said conveyor;

shifting said defective article information in said second memory means in synchronism with the movement of said defective article on said conveyor downstream, away from said inspection machine; and rejecting said defective article from a stream of articles on said conveyor in response to the arrival of said defective article information at a rejection means responsive to said defective article information.

* * * * *